US012168339B2

(12) United States Patent
Hirai et al.

(10) Patent No.: US 12,168,339 B2
(45) Date of Patent: Dec. 17, 2024

(54) INTERIOR MEMBER FOR AIRCRAFT, MANUFACTURING METHOD OF THE SAME, AND REPLACEMENT METHOD OF THE SAME

(71) Applicant: MITSUBISHI HEAVY INDUSTRIES, LTD., Tokyo (JP)

(72) Inventors: Makoto Hirai, Tokyo (JP); Hiroshi Taneda, Tokyo (JP); Toshio Kozasa, Tokyo (JP); Masayuki Kanemasu, Tokyo (JP); Yukari Sakuragi, Tokyo (JP); Kensuke Sakaki, Tokyo (JP); Kazuhiro Okada, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 405 days.

(21) Appl. No.: 16/759,389

(22) PCT Filed: Jun. 20, 2019

(86) PCT No.: PCT/JP2019/024529
§ 371 (c)(1),
(2) Date: Apr. 27, 2020

(87) PCT Pub. No.: WO2020/004226
PCT Pub. Date: Jan. 2, 2020

(65) Prior Publication Data
US 2020/0324532 A1 Oct. 15, 2020

(30) Foreign Application Priority Data
Jun. 29, 2018 (JP) .................................. 2018-124774

(51) Int. Cl.
*B32B 27/12* (2006.01)
*B32B 3/12* (2006.01)
(Continued)

(52) U.S. Cl.
CPC ................ *B32B 27/12* (2013.01); *B32B 3/12* (2013.01); *B32B 5/18* (2013.01); *B32B 5/24* (2013.01);
(Continued)

(58) Field of Classification Search
CPC .... B32B 3/12; B32B 5/18; B32B 5/24; B32B 7/14; B32B 27/06; B32B 27/12;
(Continued)

(56) References Cited

U.S. PATENT DOCUMENTS

| | | | |
|---|---|---|---|
| 2003/0044600 A1 | 3/2003 | Okuyama | |
| 2005/0050782 A1* | 3/2005 | Ryan | B60R 13/02 40/606.07 |

(Continued)

FOREIGN PATENT DOCUMENTS

| | | |
|---|---|---|
| EP | 2810777 A1 | 12/2014 |
| JP | 2001295454 A | 10/2001 |

(Continued)

OTHER PUBLICATIONS

Extended European Search Report issued in corresponding European Application No. 19825496.3 mailed Jan. 12, 2021; 7pp.

(Continued)

*Primary Examiner* — Maria V Ewald
*Assistant Examiner* — Ethan Weydemeyer
(74) *Attorney, Agent, or Firm* — HAUPTMAN HAM, LLP

(57) ABSTRACT

It is an object of the present disclosure to provide an interior member for an aircraft, a manufacturing method of the member and a replacement method of the member in which replacement cost can be reduced. An interior member for an aircraft according to the present disclosure includes a substrate, a decorative layer that covers the surface of the substrate, and an adhesive layer that adheres to the decora- (Continued)

tive layer to the substrate, and the decorative layer is peelably pasted to the surface of the substrate via the adhesive layer in a range that meets a required adhesive strength and that does not affect the substrate.

6 Claims, 3 Drawing Sheets

(51) Int. Cl.
| | |
|---|---|
| *B32B 5/18* | (2006.01) |
| *B32B 5/24* | (2006.01) |
| *B32B 7/14* | (2006.01) |
| *B32B 27/06* | (2006.01) |
| *B32B 37/12* | (2006.01) |
| *B64D 11/00* | (2006.01) |
| *C09J 5/00* | (2006.01) |
| *C09J 9/00* | (2006.01) |
| *C09J 163/00* | (2006.01) |
| *C09J 179/08* | (2006.01) |

(52) U.S. Cl.
CPC ............... *B32B 7/14* (2013.01); *B32B 27/06* (2013.01); *B32B 37/1207* (2013.01); *B64D 11/00* (2013.01); *C09J 5/00* (2013.01); *C09J 9/00* (2013.01); *C09J 163/00* (2013.01); *C09J 179/08* (2013.01); *B32B 2037/1215* (2013.01); *B32B 2255/10* (2013.01); *B32B 2262/0269* (2013.01); *B32B 2262/101* (2013.01); *B32B 2262/106* (2013.01); *B32B 2307/3065* (2013.01); *B32B 2451/00* (2013.01); *B32B 2605/003* (2013.01); *B32B 2605/18* (2013.01); *C09J 2463/00* (2013.01); *C09J 2479/08* (2013.01)

(58) Field of Classification Search
CPC ........ B32B 37/1207; B32B 2037/1215; B32B 2255/10; B32B 2262/0269; B32B 2262/101; B32B 2262/106; B32B 2307/3065; B32B 2451/00; B32B 2605/003; B32B 2605/18; B64D 11/00; C09J 5/00; C09J 9/00; C09J 163/00; C09J 179/08; C09J 2463/00; C09J 2479/08

See application file for complete search history.

(56) References Cited

U.S. PATENT DOCUMENTS

| | | | |
|---|---|---|---|
| 2009/0166472 A1* | 7/2009 | Kook | ................. B64C 1/18 244/129.1 |
| 2014/0050901 A1 | 2/2014 | Adams | |
| 2014/0182778 A1 | 7/2014 | Kabutoya et al. | |
| 2014/0234593 A1 | 8/2014 | Umeda et al. | |
| 2014/0363637 A1 | 12/2014 | Kovach et al. | |
| 2018/0016028 A1 | 1/2018 | Kovach et al. | |

FOREIGN PATENT DOCUMENTS

| | | |
|---|---|---|
| JP | 2001523295 A | 11/2001 |
| JP | 2004017299 A | 1/2004 |
| JP | 2013137510 A | 7/2013 |
| JP | 2014126206 A | 7/2014 |
| JP | 2015013466 A | 1/2015 |
| WO | 9850480 A1 | 11/1998 |
| WO | 2013058273 A1 | 4/2013 |

OTHER PUBLICATIONS

International Search Report issued in corresponding International Application No. PCT/JP2019/024529; mailed Aug. 20, 2019; State Intellectual Property Office of the P.R. China, Beijing, China, 4 pgs.
Final Office Action issued in corresponding Japanese Application No. 2018-124774; mailed Apr. 27, 2021, 13 pgs.
Office Action issued in corresponding Japanese Application No. 2018-124774; mailed Jan. 27, 2021, 10 pgs.
Written Opinion issued in corresponding International Application No. PCT/JP2019/024529; mailed Aug. 20, 2019; State Intellectual Property Office of the P.R. China, Beijing, China, 11 pgs.

* cited by examiner

INTERIOR MEMBER FOR AIRCRAFT, MANUFACTURING METHOD OF THE SAME, AND REPLACEMENT METHOD OF THE SAME

RELATED APPLICATIONS

The present application is a National Phase of International Application Number PCT/JP2019/024529 filed Jun. 20, 2019 and claims priority to Japanese Application Number 2018-124774 filed Jun. 29, 2018.

TECHNICAL FIELD

The present disclosure relates to an interior member for an aircraft, a manufacturing method of the member, and a replacement method of the member.

BACKGROUND ART

An interior panel for an aircraft commonly has a configuration in which a decorative film serving as surface protection and decoration is pasted onto a honeycomb sandwich panel via an adhesive. A film adhesive or the like is used to bond the decorative film.

As described in PTL 1, the interior panel for the aircraft is required to be flame retardant.

In development of a private aircraft, it is important to design and manufacture the aircraft so that an aircraft fuselage itself can fly safely. Therefore, it is necessary to acquire type certification and prove that the design of the fuselage complies with safety standards.

CITATION LIST

Patent Literature

[PTL 1] U.S. Patent Application Publication No. 2014/0050901

SUMMARY OF INVENTION

Technical Problem

In a conventional interior panel, a decorative film firmly adheres to a honeycomb sandwich panel (a substrate). Therefore, peeling of the decorative film from the substrate takes time and labor. Furthermore, to peel the decorative film from such a substrate, the substrate may be deformed or broken. In such a situation, when the decorative film is to be replaced due to dirt, damage, design change of decoration, or the like, the whole substrate is replaced, and cost becomes high. Therefore, in general, it is rare to replace the interior panel for an aircraft.

If the decorative film is not peeled and is overlaid, a material configuration of the interior panel varies, and type certification is therefore required. Cost required for the type certification is high.

The present disclosure has been developed in view of such a situation, and an object thereof is to provide an interior member for an aircraft that reduces cost and is easy to replace, a manufacturing method of the member, and a replacement method of the member.

Solution to Problem

To solve the above problem, an interior member for an aircraft, a manufacturing method of the member and a replacement method of the member of the present disclosure adopt the following solutions.

In the present disclosure, provided is an interior member for an aircraft including a substrate, a decorative layer that covers the surface of the substrate, and an adhesive layer that adheres to the decorative layer to the substrate, and the decorative layer is peelably pasted to the surface of the substrate via the adhesive layer in a range that meets a required adhesive strength and that does not affect the substrate.

In the present disclosure, provided is a manufacturing method of an interior member for an aircraft including a decorative material adhering to the surface of a substrate via an adhesive, the method including: using, as the adhesive, a resin including a material that meets a required adhesive strength and allows the decorative layer to peel from the substrate by heating or external force application in a range that does not affect the substrate.

In the present disclosure, provided is a replacement method of the interior member for the aircraft, the method including peeling the decorative layer from the substrate under a condition in a range that does not affect the substrate, removing the adhesive layer, and then pasting a new decorative layer to the surface of the substrate via a new adhesive.

In the above disclosure, the decorative layer can be peeled from the substrate without damaging the substrate. Consequently, it is possible to replace the decorative layer without replacing the substrate. By reuse of the substrate, the decorative layer can be easily replaced only at cost for the decorative layer and the adhesive layer. The above interior member for the aircraft is advantageous in replacing the interior member for purposes of decoration, advertisement and the like for a temporary event.

"The adhesive" is an agent having an adhesive force or a pressure-sensitive adhesive force. "The adhesive" includes an agent of a liquid that solidifies and becomes solid to exert the adhesive force, and additionally includes a pressure sensitive adhesive that exerts the pressure-sensitive adhesive force while keeping a wet state. "The adhesive layer" is a layer that adheres to or pressure-sensitive adheres to the substrate and the decorative layer. Hereinafter, descriptions of "the adhesive strength", "the adhesive force" and "the adhesive layer" may be replaced with "a pressure-sensitive adhesive strength", "a pressure-sensitive adhesive force" and "a pressure-sensitive adhesive layer" as appropriate.

"The required adhesive strength" is a force with which the layer does not peel in an operating environment situation of the aircraft and cannot be easily peeled by a passenger. "The range that does not affect the substrate" is a range that does not cause damage or deformation, and keeps rigidity of the substrate even after the decorative layer is peeled.

To peel the decorative layer without damaging the substrate, the adhesive layer may include a resin having an adhesive force decreased by heating at a temperature in the range that does not affect the substrate.

The resin having the adhesive force decreased by the heating can meet the required adhesive strength during usual use, and when the layer is to be peeled, the resin is heated to decrease the adhesive force, so that the layer can be easily peeled.

To peel the decorative layer without damaging the substrate, the adhesive layer may include a resin having an adhesive force that meets an adhesive strength required in the interior member for the aircraft and that allows the decorative layer to peel from the substrate by applying an external force in the range that does not affect the substrate.

To peel the decorative layer without damaging the substrate, a base surface of the adhesive layer may be an uneven surface.

To peel the decorative layer without damaging the substrate, the adhesive layer may be scattered and arranged on the surface of the substrate.

To peel the decorative layer without damaging the substrate, a peel layer may be disposed on a base surface of the adhesive layer.

Advantageous Effects of Invention

According to an interior member for an aircraft, a manufacturing method of the member, and a replacement method of the member of the above disclosure, a decorative layer is made peelable, and is thereby easily replaced with a new decorative layer. Furthermore, a substrate can be reused, and hence, replacement cost can be reduced.

DESCRIPTION OF EMBODIMENTS

An interior member (an interior panel) for an aircraft according to the present disclosure is suitable especially for a side wall, a sealing, an overhead bin, a galley, a lavatory, a de-binder and the like.

Figure 1:
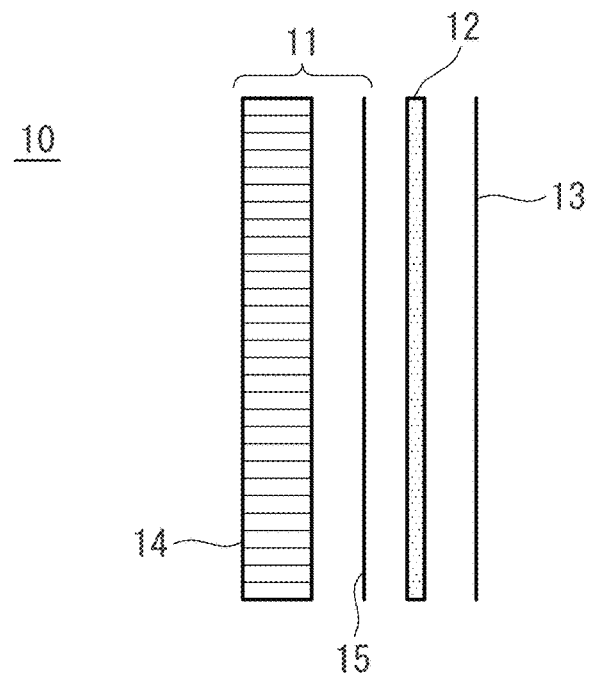
FIG. 1 is an exploded partially cross-sectional view of an interior panel according to an embodiment.

FIG. 1 is an exploded partially cross-sectional view of an interior panel according to the present embodiment. An interior panel 10 includes a substrate 11, an adhesive layer 12 and a decorative layer 13.

The substrate 11 in FIG. 1 includes a honeycomb sandwich panel 14, and an intermediate layer 15 that covers the surface of the honeycomb sandwich panel 14. The honeycomb sandwich panel 14 is a panel molded by sandwiching a honeycomb core between face sheets such as prepregs. The substrate 11 is not limited to the honeycomb sandwich panel, and may be, for example, a foam core sandwich panel. The intermediate layer 15 may be omitted.

In the honeycomb core, a commercial product is usable. The honeycomb core is made of, for example, Nomex (a registered trademark). Nomex (the registered trademark) includes a material including an aramid fiber and a phenol fiber and having a high fire resistance.

The prepreg of the face sheet includes a reinforcing fiber and a matrix resin. Examples of the reinforcing fiber include a glass fiber, a carbon fiber, and the aramid fiber. Examples of the matrix resin include a phenolic resin and an epoxy resin.

A heat-resistant temperature of the honeycomb sandwich panel 14 is from about 100° C. to 200° C. The heat-resistant temperature varies in accordance with combination of materials, or mixture of the matrix resin.

A filler that forms the intermediate layer 15 may be a thermosetting resin or a thermoplastic resin such as the epoxy resin or a polyester resin. The filler may be, for example, a paste, film or powder filler.

The adhesive layer 12 is a layer that adheres to the substrate 11 and the decorative layer 13. During usual use, the adhesive layer 12 connects the substrate 11 and the decorative layer 13 with an adhesive strength required in the interior member for the aircraft. The adhesive layer 12 includes a thermosetting resin such as the epoxy resin or a silicon resin, or an acrylic resin or another thermoplastic resin. The adhesive layer 12 may include a release agent in addition to the above resin (an adhesive) to adjust the adhesive force.

The decorative layer 13 adheres to the substrate 11 via the adhesive layer 12. The decorative layer 13 is disposed to cover the surface of the substrate 11. The decorative layer 13 is a multilayer film including, for example, a fluorine film of polyvinyl fluoride (PVF) or polyvinylidene fluoride (PVDF), and a polyvinyl chloride (PVC) film. The decorative layer 13 is a film for purposes of decoration, substrate protection and the like.

Figure 2:
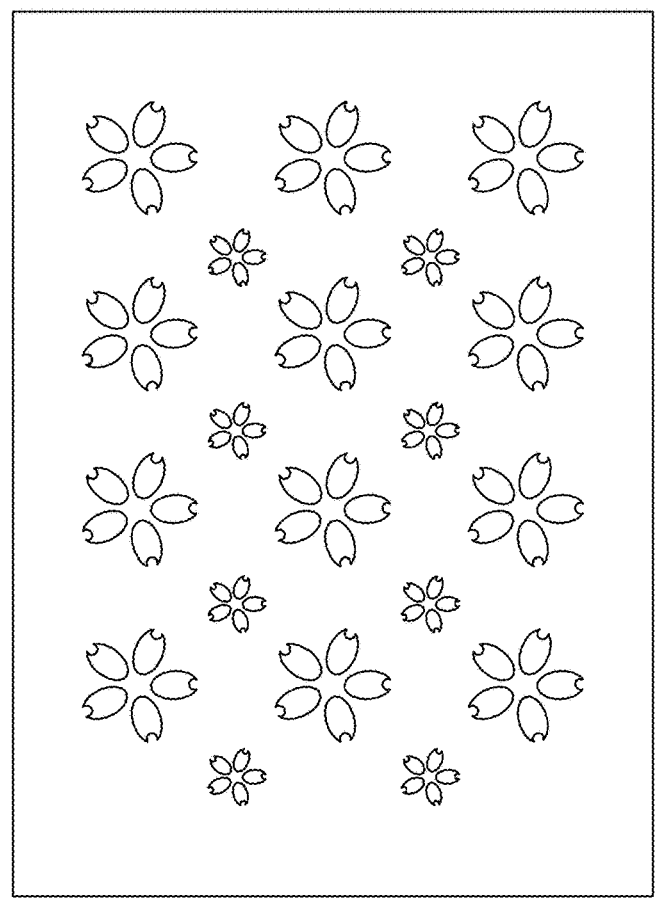
FIG. 2 is a schematic view illustrating a pattern of a decorative layer.
Figure 3:
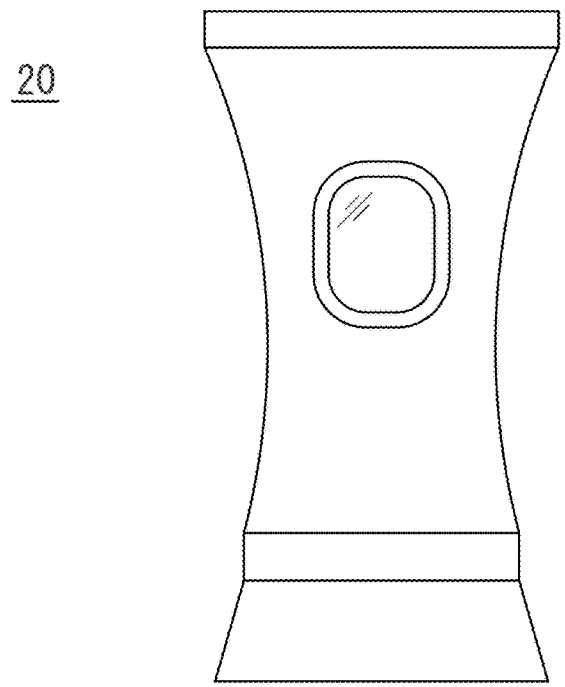
FIG. 3 is a schematic front view of a side wall.

The decorative layer 13 may be colored in desired color with paint, or may be printed with a pattern. For example, a cherry blossom pattern in FIG. 2 can be adopted on the decorative layer 13 for a side wall 20 of the aircraft shown in FIG. 3. Here, it is preferable that a type and amount of paint for use in the coloring and the pattern are selected in a range defined in, for example, a material specification.

To peel the decorative layer 13 from the substrate 11 without damaging the substrate 11, the interior panel 10 according to the present embodiment further adopts the following configuration.

FIRST EXAMPLE

The adhesive layer 12 may include a resin having an adhesive force that is controllable in accordance with a temperature. The resin is a thermoplastic resin or a thermosetting resin.

In a case where the resin that forms the adhesive layer 12 is the thermoplastic resin, a softening temperature of the thermoplastic resin for use is lower than a heat-resistant temperature of the substrate 11. The adhesive force of the adhesive layer 12 formed by hardening such a thermoplastic resin can be controlled in accordance with the temperature.

For example, it is preferable that the softening temperature of the thermoplastic resin of the adhesive layer 12 is 20° C. or more lower than a hardening temperature of the substrate 11. An example of such a thermoplastic resin is polyetherimide (PEI).

The adhesive layer 12 including the hardened thermoplastic resin is heated at a temperature that is equal to or higher than the softening temperature of the thermoplastic resin and is less than the heat-resistant temperature of the substrate 11, thereby decreasing the adhesive force. Therefore, the decorative layer 13 can be peeled from the substrate 11 without damaging the substrate 11 by the heating in a range that does not affect the substrate 11. The heating may be performed at a temperature that is about 20° C. lower than the heat-resistant temperature of the substrate 11.

In a case where the resin that forms the adhesive layer 12 is the thermosetting resin, the hardening temperature of the thermosetting resin is lower than the heat-resistant temperature of the substrate 11. The adhesive layer 12 formed by hardening this thermosetting resin can have the adhesive force that is controllable in accordance with the temperature. An example of the thermosetting resin is an epoxy resin.

The adhesive layer 12 including the hardened thermosetting resin is heated at a temperature that is equal to or higher than the hardening temperature of the thermosetting resin and is less than the heat-resistant temperature of the substrate 11, thereby decreasing the adhesive force. Therefore, the decorative layer 13 can be peeled from the substrate 11 without damaging the substrate 11, by the heating in the range that does not affect the substrate 11.

SECOND EXAMPLE

The adhesive layer 12 has an adhesive force $F_A$ that meets an adhesive strength required in the interior panel 10 for the aircraft and that allows the decorative layer 13 to peel without damaging the substrate 11 to which a strong force (an external force $F_C$) is applied. The adhesive layer 12 includes a resin that can exert the adhesive force $F_A$.

The decorative layer 13 adherers to the substrate 11 with the adhesive force $F_A$ withstands an operating environment, and cannot be easily peeled by a passenger. The adhesive force $F_A$ of the adhesive layer 12 is smaller than an adhesive force of a heretofore used adhesive. The external force $F_C$ to be applied in the range that does not affect the substrate 11 depends on a rigidity of the substrate 11. Adhesive force $F_A$ is smaller than the external force $F_C$.

The present example can be combined with the above first example. In this case, the adhesive force $F_A$ changes before and after the heating. That is, the adhesive layer 12 before heated has an adhesive force $F_{Aa}$ that meets the adhesive strength required in the interior panel 10 for the aircraft, and the heated adhesive layer 12 has an adhesive force $F_{Ab}$ that allows the decorative layer 13 to peel without damaging the substrate 11. The adhesive force $F_{Ab}$ is smaller than the adhesive force $F_{Aa}$. The adhesive force $F_A$ changes with the heating, so that the decorative layer 13 can be peeled without damaging the substrate 11, while increasing the adhesive force during the usual use. Furthermore, more options of the usable adhesive become available.

THIRD EXAMPLE

In the present example, the adhesive layer 12 has a base surface that is an uneven surface. A base in the present example is the intermediate layer 15. The intermediate layer 15 has the uneven surface on a side that adheres to the adhesive layer 12. When an area ratio of a protrusion is decreased, a contact area decreases, and an adhesive force of the adhesive layer 12 to the intermediate layer 15 decreases. An adhesive force $F_D$ of the adhesive layer 12 to the surface of the intermediate layer 15 may be equivalent to the adhesive force $F_A$ of the above second example. Consequently, the adhesive strength required in the interior panel 10 for the aircraft is met, while the decorative layer 13 can be peeled from the substrate 11 without damaging the substrate 11 to which the strong force (the external force $F_C$) is applied. The adhesive layer 12 includes a resin that can exert the adhesive force $F_D$. In the present example, an adhesion area of the layer is smaller than that in the second example, and hence, the resin that forms the adhesive layer 12 has an adhesive force larger than that of the resin for use in the second example.

The present example can be combined with the above first example. The adhesive force $F_D$ changes before and after heating. That is, the adhesive layer 12 before heated has an adhesive force $F_{Da}$ that meets the adhesive strength required in the interior panel 10 for the aircraft, and the heated adhesive layer 12 has an adhesive force $F_{Db}$ that allows the decorative layer 13 to peel without damaging the substrate 11. The adhesive force $F_{Db}$ is smaller than the adhesive force $F_{Da}$. The adhesive force $F_D$ changes by the heating, so that the decorative layer 13 can be peeled without damaging the substrate 11, while increasing the adhesive force during the usual use. Furthermore, more options of the usable adhesive become available. For example, a resin having a small control width of the adhesive force depending on a temperature is usable as a material of the adhesive layer 12. Furthermore, the combination with the first example is valid in a case where the adhesive force $F_D$ cannot be smaller than the external force $F_C$ only by providing the uneven surface.

The present example can be combined also with the above second example.

FOURTH EXAMPLE

Figure 4:
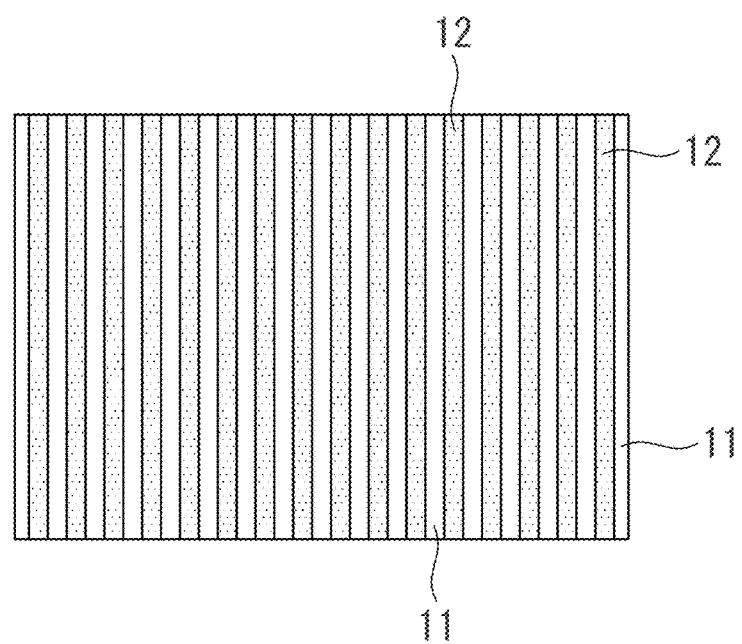
FIG. 4 is a schematic view showing an arrangement example of an adhesive layer.
Figure 5:
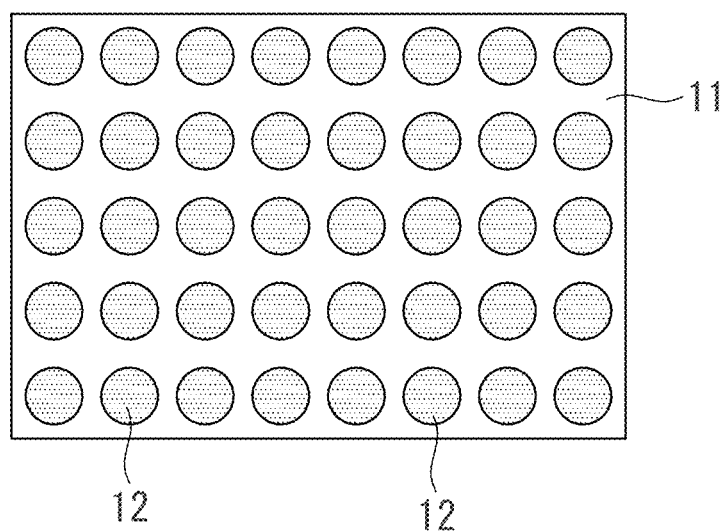
FIG. 5 is a schematic view showing an arrangement example of the adhesive layer.

The adhesive layer 12 may be scattered and arranged. For example, the adhesive layer 12 may be arranged in vertical stripes (see FIG. 4), horizontal stripes, wavy stripes, diagonal stripes, or dots (see FIG. 5). A contact area decreases not only depending on an adhesive force of the adhesive layer 12 but also depending on the adhesive layer 12 provided in this manner, so that the decorative layer 13 can be easily peeled.

The adhesive layer 12 may be arranged, for example, in the vertical stripes, horizontal stripes, wavy stripes, diagonal stripes, or dots. An adhesive force $F_E$ of the adhesive layer 12 to the substrate 11 may be equivalent to the adhesive force $F_A$ of the above second example. An installation area of the adhesive layer 12 is set so that the adhesive force $F_E$ is equivalent to the adhesive force $F_A$. Consequently, the decorative layer 13 can be peeled from the substrate 11 without damaging the substrate 11. The adhesive layer 12 includes a resin that can exert the adhesive force $F_E$. In the present example, an adhesion area of the layer is smaller than that of the second example, and hence, the resin that forms the adhesive layer 12 has an adhesive force larger than that of the resin for use in the second example.

The present example can be combined with the above first example. In the combination of the present example with the first example, a resin having a small control width of the adhesive force depending on a temperature is usable as a material of the adhesive layer 12 in the same manner as in the combination of the first example with the third example. Furthermore, the combination with the first example is valid in a case where the adhesive force $F_E$ cannot be smaller than the external force $F_C$ only by scattering and arranging the adhesive layer 12.

The present example can be combined with the above second and third examples.

FIFTH EXAMPLE

In the present example, a peel layer (not shown) is disposed between the substrate 11 and the adhesive layer 12 and on a base surface of the adhesive layer 12. The peel layer includes a release agent. The release agent is, for example, a silicon release agent of Frekote or the like. The peel layer is provided, to decrease an adhesive force of the adhesive layer 12 to a base, so that the decorative layer 13 can be easily peeled.

The peel layer may be scattered and arranged. "Scattering arrangement" means arrangement in vertical stripes, horizontal stripes, wavy stripes, diagonal stripes, dots, or the like. In the peel layer, an adhesive force $F_G$ of the adhesive layer 12 to the substrate 11 may be equivalent to the adhesive force $F_A$ of the above second example. An installation area of the peel layer is set so that the adhesive force $F_G$ is equivalent to the adhesive force $F_A$. Consequently, the decorative layer 13 can be peeled from the substrate 11 without damaging the substrate 11.

The present example can be combined with the above first example. In the combination of the present example with the first example, a resin having a small control width of the adhesive force depending on a temperature is usable as a material of the adhesive layer 12 in the same manner as in the combination of the first example with the third and fourth examples. Furthermore, the combination with the first example is valid in a case where the adhesive force $F_C$ cannot be smaller than the external force $F_C$ only by disposing the peel layer.

The present example can be combined with the above second to fourth examples. In a case where the example is combined with the fourth example, for example, the adhesive layer 12 and the peel layer can be arranged so that patterns are superimposed on each other.

According to the above first to fifth examples or any combination of the examples, the decorative layer 13 pasted to the substrate 11 can be peeled without damaging the substrate 11. Consequently, it is possible to reuse the substrate 11 from which the decorative layer 13 is peeled.

According to the above first to fifth examples or any combination of the examples, in a case where the interior panel 10 is dirty or decorative design is to be changed, only the decorative layer 13 of a surface layer needs to be peeled, and a new decorative layer is pasted, so that the interior panel can be reproduced. In a case where the new decorative layer is formed in the same configuration as in the decorative layer 13 to be replaced, or a difference in configuration falls into a range that does not deviate from definition such as material specification, it is not necessary to acquire type certification of the reproduced interior panel.

Hereinafter, description will be made as to a manufacturing method of the interior panel according to the above embodiment and a replacement method of the decorative layer.

Manufacturing Method of Interior Panel

Substrate

In a case where the honeycomb sandwich panel 14 is used, the surface of the honeycomb sandwich panel 14 is covered with a filler, and the surface is smoothened. Thereafter, the filler is cured at normal temperature or heated to harden, thereby obtaining the substrate 11 including the honeycomb sandwich panel 14 and the intermediate layer 15. In a case where the intermediate layer 15 (the filler) is not provided, this step is omitted.

Predetermined smoothness or predetermined unevenness may be imparted to the substrate surface. In a case where the filler is provided, the smoothness or the unevenness may be imparted at timing either before or after hardening.

In a case where the peel layer is provided, a release agent is applied to a layer (the intermediate layer 15, or a honeycomb core surface if the intermediate layer 15 is not provided) that is a base of the adhesive layer 12. It is preferable to scatter and apply the release agent, for example, in vertical stripes, horizontal stripes, wavy stripes, diagonal stripes, or dots.

Adhesive layer and Decorative Layer

A back surface of a decorative film is coated with an adhesive. The whole surface may be coated with the adhesive, or the agent may be applied in the vertical stripes, horizontal stripes, wavy stripes, diagonal stripes, or dots. The adhesive may be applied in a suitable shape in accordance with a type of adhesive, presence/absence of the peel layer, a shape of the substrate surface or the like. Note that the adhesive is not limited to the coating of the back surface of the decorative film, and the substrate surface may be coated. The adhesive may be an adhesive film.

The decorative film having a surface coated with the adhesive and directed toward the substrate 11 is superimposed, to bond the decorative film to the substrate 11. In a case where the adhesive is a thermosetting resin, the agent is hardened by heating to obtain the adhesive layer 12 and the decorative layer 13. In a case where the adhesive is a thermoplastic resin, the agent is hardened by cooling to obtain the adhesive layer 12 and the decorative layer 13.

The decorative film can be manually pasted, or pasted by vacuum forming such as three-dimensional overlay method (TOM method). By use of the vacuum forming, air is inhibited from entering a space between the decorative film and the substrate 11, and hence, quality of the pasting improves. Furthermore, in the vacuum forming, the decorative film can be inexpensively pasted in a beautiful condition of appearance in a short time.

Replacement Method of Decorative Layer

In the interior panel 10 according to the above embodiment, the decorative layer 13 can be peeled and replaced with a new decorative layer 13 without replacing the substrate.

The interior panel 10 including the adhesive layer 12 of the above first example is removed from the aircraft, and heated in an oven, to obtain a state where the adhesive force of the adhesive layer 12 decreases, so that the decorative layer 13 can be peeled without damaging the substrate 11. A heating temperature is less than a heat-resistant temperature of the substrate 11, and is equal to or higher than a hardening temperature of a material resin of the adhesive layer 12. A heating means is not limited to the oven, and the panel may be locally heated with an iron or the like.

The interior panel 10 of each of the above second to fifth examples combined with the above first example is removed from the aircraft, and heated in the oven, to obtain the state where the adhesive force of the adhesive layer 12 decreases, so that the decorative layer 13 can be peeled without damaging the substrate 11. In a case where the adhesive layer 12 having an adhesive force weaker than before is adopted as in the second to fifth examples, the decorative layer 13 can be peeled without damaging the substrate 11 by applying the external force $F_C$ in a range that does not affect the substrate 11.

The new decorative layer can be pasted also by vacuum forming such as TOM method in the same manner as in the above manufacturing method of the interior panel.

According to the above embodiment, the film can be easily replaced without replacing the substrate 11 only at cost for the decorative film and the adhesion, and hence, the interior panel 10 can be used in decoration, advertisement or the like for a temporary event.

The above embodiment is applicable to any region where the decorative film is used in a cabin interior panel for the aircraft.

The invention claimed is:
1. An interior member for an aircraft, comprising:
a substrate including a honeycomb sandwich panel or a foam core sandwich panel and an intermediate layer that covers a surface of the honeycomb sandwich panel or a surface of the foam core sandwich panel, a decorative layer that covers a surface of the substrate, an adhesive layer that is arranged vertical stripes, horizontal stripes, wavy stripes, diagonal stripes, or dots and that adheres to the decorative layer to the substrate so as to meet a required adhesive strength, and a peel layer that is disposed between the intermediate layer and the adhesive layer and that includes a release agent to decrease an adhesive force of the adhesive layer to the intermediate layer, wherein the decorative layer is-pasted to the surface of the substrate via the adhesive layer, and the decorative layer pasted to the surface of the substrate is peelable by heating at a temperature lower than a heat-resistant temperature of the substrate, the adhesive layer has a softening temperature lower than the heat-resistant temperature of the substrate, and does not include an unfoamed foaming agent and foam, a resin forming the adhesive layer consists of a thermoplastic resin having an adhesive strength decreased by heating at a temperature lower than the heat-resistant temperature of the substrate, and the intermediate layer is formed by a filler and has an uneven surface facing the adhesive layer.

2. The interior member for the aircraft according to claim 1, wherein the adhesive layer comprises a thermoplastic resin having an adhesive strength that is required in the interior member for the aircraft and that allows the decorative layer to peel from the substrate by applying an external force causing no detrimental damage or deformation of the substrate and no damage of the honeycomb sandwich panel or the foam core sandwich panel, and no peeling in an adhesive layer and/or at adhesive interfaces including an intermediate layer adjacent to the substrate.

3. The interior member for the aircraft according to claim 1, wherein the adhesive layer is scattered and arranged on the surface of the substrate.

4. A manufacturing method of interior member for the aircraft comprising a decorative material adhering, via an adhesive, to the surface of the substrate including the honeycomb sandwich panel or the foam core sandwich panel, the method according to claim 1 comprising:

using, as the adhesive, a resin that meets the adhesive strength required in the interior member for the aircraft, that has the softening temperature or a hardening temperature lower than the heat-resistant temperature of the substrate, and that allows the decorative layer to peel from the substrate by heating at a temperature equal to or higher than the softening temperature or the hardening temperature and lower than the heat-resistant temperature of the substrate or by external force application in a range, wherein the adhesive layer formed by hardening the resin does not include an unfoamed foaming agent and foam.

5. A replacement method of the interior member for the aircraft according to claim 1, the method comprising:

peeling the decorative layer from the substrate by heating at a temperature equal to or higher than the softening temperature or the hardening temperature of the adhesive layer and lower than the heat-resistant temperature of the substrate or by external force application in a range, removing the adhesive layer, and then pasting a new decorative layer to the surface of the substrate via a new adhesive.

6. An interior member for an aircraft, comprising:

a substrate including a honeycomb sandwich panel in which a honeycomb core is sandwiched between face sheets or a foam core sandwich panel in which a foam core is sandwiched between face sheets and an intermediate layer that covers a surface of each face sheet of the honeycomb sandwich panel or a surface of each face sheet of the foam core sandwich panel, a decorative layer that covers a surface of the substrate, an adhesive layer that is arranged vertical stripes, horizontal stripes, wavy stripes, diagonal stripes, or dots and that adheres to the decorative layer to the substrate so as to meet a required adhesive strength, and a peel layer that is disposed between the intermediate layer and the adhesive layer and that includes a release agent to decrease an adhesive force of the adhesive layer to the intermediate layer, wherein the decorative layer is-pasted to the surface of the substrate via the adhesive layer, and the decorative layer pasted to the surface of the substrate is peelable by heating at a temperature lower than a heat-resistant temperature of the substrate, the adhesive layer has a softening temperature lower than the heat-resistant temperature of the substrate, and does not include an unfoamed foaming agent and foam, a resin forming the adhesive layer consists of a thermoplastic resin having an adhesive strength decreased by heating at a temperature lower than the heat-resistant temperature of the substrate, and the intermediate layer is formed by a filler and has an uneven surface facing the adhesive layer.

* * * * *